United States Patent [19]

Suhoza

[11] Patent Number: 5,219,892
[45] Date of Patent: Jun. 15, 1993

[54] LIQUID STABILIZER COMPOSITIONS FOR POLYOLS AND POLYURETHANE FOAM

[75] Inventor: Richard A. Suhoza, Norwalk, Conn.

[73] Assignee: R. T. Vanderbilt Company, Inc., Norwalk, Conn.

[21] Appl. No.: 899,523

[22] Filed: Jun. 16, 1992

[51] Int. Cl.$^5$ .................. C08K 5/47; C08K 5/18
[52] U.S. Cl. ...................... 521/107; 252/182.24; 252/182.27; 252/182.29; 252/404; 252/405; 521/117; 521/128; 524/83; 524/258; 524/291
[58] Field of Search .......... 521/117, 128, 107; 252/182.24, 182.27, 182.29, 404, 405; 524/83, 258, 291

[56] References Cited

U.S. PATENT DOCUMENTS

| | | | |
|---|---|---|---|
| 3,285,855 | 11/1966 | Dexter et al. | 252/405 |
| 3,637,865 | 1/1972 | Haring | 524/258 |
| 4,007,230 | 2/1977 | Hinze | 524/258 |
| 4,070,304 | 1/1978 | Hinze | 252/404 |
| 4,228,247 | 10/1980 | Moore et al. | 521/128 |
| 4,265,783 | 5/1981 | Hinze | 252/182.27 |
| 4,444,676 | 4/1984 | Statton et al. | 252/182 |
| 4,824,601 | 4/1989 | Franklin | 252/401 |
| 4,914,137 | 4/1990 | Smith et al. | 521/117 |
| 4,933,374 | 6/1990 | Suhoza et al. | 252/182.27 |
| 5,006,599 | 4/1991 | Gupta et al. | 252/182.27 |
| 5,143,943 | 9/1992 | Suhoza et al. | 521/128 |
| 5,156,762 | 10/1992 | Suhoza et al. | 521/128 |

OTHER PUBLICATIONS

K. C. Frisch and J. H. Saunders, ed. Plastic Foams, Part 1, 118-125 (1972).

G. L. Statton and J. M. Gaul, *Evaluation of Hindered Phenols for Minimization of Foam Discoloration using the Microwave Scorch Test*, 20 J. Cellurac Plastics, 346-50 (1984).

Primary Examiner—Veronica P. Hoke
Attorney, Agent, or Firm—Rasma B. Balodis

[57] ABSTRACT

Polyether polyols and polyurethane foams are stabilized by including therein a stabilizer composition of (a) tetrakis[methylene(3,5-di-tert-butyl-4-hydroxyhydrocinnamate)]methane and (b) a reaction product of diphenylamine and diisobutylene wherein the molar ratio of the amine to the diisobutylene is 1:1.1 to 1:2.5. The stabilizer composition may contain a third synergistic component, phenothiazine or certain alkyl derivatives of phenothiazine. The stabilizer composition may further contain trihydrocarbyl phosphite to stabilize the color of same.

13 Claims, No Drawings

LIQUID STABILIZER COMPOSITIONS FOR POLYOLS AND POLYURETHANE FOAM

BACKGROUND OF THE INVENTION

The present invention concerns stabilization of polyoxyalkylene polyether polyols and the use of the stabilized polyols in the preparation of polyurethane foam. In particular the invention relates to stabilization of polyols with certain liquid stabilizer compositions and the color or scorch inhibition of flexible and semiflexible polyurethane foams made from the stabilized polyols.

Prior art methods for stabilization of polyoxyalkylene polyether polyols with solid antioxidants or stabilizers and the use of the stabilized polyols in the preparation of polyurethane foams to inhibit scorch are well known.

Conventional solid stabilizers are generally dissolved in the polyol media by heating. To remove any undissolved stabilizer solids, the entire voluminous polyol mass is subjected to a filtration step. Then the polyol precursor can be processed into the final foam product.

U.S. Pat. No. 4,444,676 discloses a method for stabilization of polyoxyalkylene polyether polyols with a solid synergistic stabilizing composition consisting of mixed butylated phenols, p,p'-dialkyldiphenylamine and a phenothiazine compound.

U.S. patent application Ser. No. 07/836,486 now U.S. Pat. No. 5,143,943 teaches a method for reducing scorch of polyurethane foam by incorporating a liquid stabilizer composition consisting of 2,6-di-tert-butyl-4-sec-butylphenol, a reaction product of diisobutylene, styrene and diphenylamine, and a phenothiazine compound. The liquid stabilizer eliminates certain processing disadvantages associated with solid stabilizer systems. The liquid stabilizer compositions are readily soluble in the polyol media at ambient temperatures. Consequently, two steps of the conventional process may be eliminated: dissolution of the stabilizer in the polyol media by heating and removal of undissolved stabilizer solids by filtration. Furthermore, the liquid stabilizer compositions may be added to the polyol by metering or pumping for convenience and safety.

There is a technological need to develop a variety of liquid stabilizer systems for economically sound processing of polyurethane foams for the preparation of various articles useful in the household, packaging, automotive field and industry.

Surprisingly, it has been discovered that tetrakis[methylene(3,5-di-tert-butyl-4-hydroxyhydrocinnimate)]methane and a reaction product of diisobutylene and diphenylamine act synergistically as scorch inhibiors in polyurethane processing. The two component stabilizer composition has the desirable characteristic of being liquid. Furthermore, phenothiazine and certain alkyl derivatives can be incorporated into the stabilizer composition without destroying its liquid character, while synergistically improving the overall scorch inhibiting properties of the stabilizer.

SUMMARY OF THE INVENTION

According to the invention, there are provided polyoxyalkylene polyether polyol compositions stabilized against oxidative degradation with a stabilizing amount of a synergistic mixture of (1) tetrakis[methylene(3,5-di-tert-butyl-4-hydroxyhydrocinnamate)]methane(-hereinafter hydrocinnamate compound) and (2) a reaction product of diisobutylene and diphenylamine, wherein the ratio of the hydrocinnamate compound to the reaction product is about 1:5 to 5:1.

According to another aspect of the invention, the synergistic mixture of tetrakis[methylene(3,5-di-tert-butyl-4-hydroxyhydrocinnamate)]methane and the reaction product of diisobutylene and diphenylamine may further contain phenothiazine compound of the formula I.

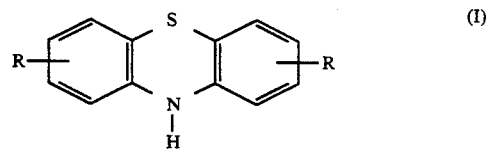

wherein each R is independently hydrogen or an alkyl group having 9 to 26 carbon atoms, and wherein the ratio of the mixture to the phenothiazine compound is about 9.0:0.05 to 9.0:0.5.

Another aspect of the invention concerns a method for the stabilization of a polyoxyalkylene polyether polyol against oxidative degradation and the use of the stabilized polyol together with polyisocyanates to prepare scorch stabilized polyurethane foam, wherein the polyol contains about 0.01 to 5.0 percent by weight of a synergistic mixture consisting of (1) tetrakis[methylene(3,5-di-tert-butyl-4-hydroxyhydrocinnamate)]methane (2) a reaction product of diisobutylene and diphenylamine and (3) a phenothiazine compound of formula I.

DETAILED DESCRIPTION OF THE INVENTION

The synergistic stabilizer or antiscorch composition is composed of known compounds. The liquid reaction product of diisobutylene and diphenylamine is prepared in the presence of aluminum chloride catalyst by known methods. In another method disclosed in U.S. Pat. No. 4,824,601, diphenylamine is alkylated with diisobutylene in the presence of acid-activated earth catalyst.

The alkylation process uses a molar excess of diisobutylene. The preferred molar ratio of diphenylamine to diisobutylene is 1:1.1 to 1:2.5.

The liquid alkylation product is a mixture of diphenylamine compounds containing the following compounds that have been identified.
4-tert-butyldiphenylamine,
4-tert-octyldiphenylamine,
4,4'-di-tert-butyldiphenylamine,
2,4,4'-tris-tert-butyldiphenylamine,
4-tert-butyl-4'-tert-octyldiphenylamine,
o,o'-,m,m'-or p,p'-di-tert-octyldiphenylamine,
2,4-di-tert-butyl-4'-tert-octyldiphenylamine,
4,4'-di-tert-octyldiphenylamine,
2,4-di-tert-octyl-4'-tert-butyldiphenylamine, and
residual diphenylamine.

The percentages of the individual alkyl derivatives depend on the actual process conditions. For the present invention, particularly preferred are reaction products that are highly alkylated and contain about 47.0 to 65.0 percent dialkyldiphenylamine derivatives, 22.8 to 43.5 percent monoalkyldiphenylamine derivatives and less than 7.0 percent of unreacted diphenylamine.

The second component of the stabilizer composition, tetrakis[methyllene(3,5-di-tert-butyl-4-hydroxyhydrocinnamate)]methane is a known material available commercially. Alternately, the compound can be prepared by a transesterification method described in U.S. Pat. No. 3,644,482.

The third component of the stabilizer composition is represented by the formula I hereinabove. This includes unsubstituted phenothiazine, monoalkylphenothiazine, dialkylphenothiazine and mixtures thereof. The position of each alkyl group on each of the two aromatic rings is not critical. The alkyl groups represented by the radical R contain 9 to 26 carbon atoms. The alkyl groups may be straight chain or branched chain. The illustrative phenothiazine compounds include dinonylphenothiazine, didodecylphenothiazine, dioctadecylphenothiazine, dieicosylphenothiazine and ditetracosylphenothiazine.

To preserve the liquid character of the stabilizer system, the phenothiazine compound is dissolved in polyol or the polyether-isocyanate prepolymer and the desired amount of the stock solution added to the other two ingredients.

Unexpectedly, tetrakis[methylene(3,5-di-tert-butyl-4-hydroxyhydrocinnamate)]methane and the reaction product of diisobutylene and diphenylamine produce a synergistic stabilizing effect in polyols when combined in certain critical ratios. Synergism is displayed when the hydrocinnamate compound and the reaction product is present in the ratio of 1:5 to 5:1.

Some polyurethane foam formulations have a higher degree of tendency to scorch during processing. In those cases, it is advantageous to add a third component, a phenothiazine compound, to the stabilizer system. The phenothiazine compound interacts synergistically with the two component stabilizer mixture when present in critical ratios. A preferred ratio of the mixture to the phenothiazine compound is 9.0:0.05 to 9.0:0.5.

The antioxidant composition has a tendency to discolor upon standing. To prolong the shelf-life of the compositions, it is advantageous to add about 0.5 to 10.00 percent of trihydrocarbyl phosphite wherein the hydrocarbyl group may be independently selected from phenyl and alkyl groups. Preferred are alkyl derivatives having 5 to 13 carbons and higher. Particularly preferred are the compounds tridecyl phosphite and phenyl diisodecyl phosphite.

The compositions of the invention may be incorporated in the polyol precursors in an amount effective to produce the desired stability. Typically, an amount from about 0.01 to 5.0 percent will be sufficient. A preferred range is from about 0.3 to 1.0 percent by weight of the total polyol composition. Because of their liquid nature, the stabilizer composition may be incorporated into the polyol by simply stirring at ambient temperatures.

The polyol components which may be stabilized with the stabilizer composition of the invention include polyoxyalkylene polyether polyols having 2 to about 10 hydroxy groups. Particularly suitable polyols include those having a molecular weight of about 200 to 10,000 or higher. Preferred are polyols derived from diols and triols with a molecular weight ranging from 1000 for diols to 6000 for triols.

The polyether polyols possess two or more ether groups in the molecule. The polyols are derived from, among others, ethylene oxide, propylene oxide, epichlorohydrin, styrene oxide, diethylene glycol, triethylene glycol, trimethylolpropane, glycerine, hexanetriol, butanetriol and the like. Polyether polyols suitable for preparation of flexible polyurethane foams and methods of their preparation are described in K. C. Frisch and J. H. Saunders, ed., PLASTIC FOAMS, Part 1, 118-125 (1972).

In the preparation of flexible polyurethane foams, the stabilized polyol compositions are reacted with a polyisocyanate compound containing two or more —N=C=O groups per molecule in the presence of catalysts, surfactants, water and optionally, auxiliary blowing agents. Commercially available polyisocyanates include, among others, toluene-(2,4 and/or 2,6)diisocyanate, 4,4'-diphenylmethane diisocyanate, polyisocyanate from aniline-formaldehyde oligomers and aliphatic isocyanates such as methylcyclohexane diisocyanate and the like. Known surfactants of the silicone type are generally used for the foaming process. Commercially available catalysts are of the tin and amine type.

Because of increased safety considerations, flexible and semiflexible polyurethane may contain flame retardants. The latter are known compounds containing phosphorus, antimony, boron, bismuth and halogen or combinations thereof. The polyurethane may contain other additives such as fillers, plasticizers, reodorants, ultraviolet and thermal stabilizers and the like.

Preparation of the polyurethane foam is conducted by a known process. Foaming of the polyol/isocyanate formulation is conducted at ambient temperature and the subsequent curing of the foam at 120° to 205° C.

The data hereinbelow are intended to illustrate, but not to limit the scope of the invention. Unless otherwise stated, all parts and percentages in the specification and claims are expressed by weight.

EXAMPLE 1

Scorch resistance of polyurethane foams was determined by the microwave scorch test.

The specimens given in Table I were prepared by mixing the ingredients in a high intensity mixer, pouring into 35×35×13.75 cm cardboard box and recording the cream and rise time (health bubbles). The foamed specimens were placed in a microwave oven at 30% power for 7.5 minutes, rotated 180 degrees and microwaved for 7.5 minutes. Thereafter, the specimens were placed in a 121° C. forced air convection oven for 2 minutes to cure skin and then allowed to cure for 30 minutes at room temperature. The peak exotherm was measured for 10 minutes with a digital thermometer. The cured foam was cut open and discoloration was determined by visual inspection.

Specimen 1 contained no stabilizer and was severely discolored. Specimen 2 contained tetrakis[methylene(3,5-di-tert-butyl-4-hydroxyhydrocinnamate)]methane, and specimen 3 contained a reaction product of diisobutylene and diphenylamine, CAS Reg. No. 68411-46-1. Both specimens were severely discolored. Specimens 4 and 5 contained the synergistic two component mixtures of the invention and showed light to moderate discoloration as a result of improved scorch resistance.

TABLE I

| COMPONENTS | COMPOSITIONS, PARTS | | | | |
|---|---|---|---|---|---|
| | 1 | 2 | 3 | 4 | 5 |
| Polyether polyol[1] | 100.00 | 100.00 | 100.00 | 100.00 | 100.00 |
| Distilled water | 5.50 | 5.50 | 5.50 | 5.50 | 5.50 |
| Silicone surfactant[2] | 1.20 | 1.20 | 1.20 | 1.20 | 1.20 |
| Amine catalyst[3] | 0.47 | 0.47 | 0.47 | 0.47 | 0.47 |
| Flame retardant[4] | 7.00 | 7.00 | 7.00 | 7.00 | 7.00 |
| Tin catalyst[5] | 0.25 | 0.25 | 0.25 | 0.25 | 0.25 |

TABLE I-continued

| COMPONENTS | COMPOSITIONS, PARTS | | | | |
|---|---|---|---|---|---|
| | 1 | 2 | 3 | 4 | 5 |
| Toluene diisocyanate | 70.80 | 70.80 | 70.80 | 70.80 | 70.80 |
| Hydrocinnamate compound | — | 0.5 | — | 0.125 | 0.25 |
| Reaction product | — | — | 0.5 | 0.375 | 0.25 |
| Scorch | Very Severe | Severe | Severe | Very Light | Moderate |

[1] NIAX$^R$ 16-52 manufactured by Union Carbide Company
[2] NIAX L-5750 manufactured by Union Carbide Company
[3] NIAX A 127 manufactured by Union Carbide Company
[4] FYROL FR 2 manufactured by Akzo
[5] NIAX D 19 manufactured by Union Carbide Company

TABLE II

| COMPONENTS | COMPOSITIONS, PARTS | | | | |
|---|---|---|---|---|---|
| | 6 | 7 | 8 | 9 | 10 |
| Polyether polyol[1] | 100.00 | 100.00 | 100.00 | 100.00 | 100.00 |
| Distilled water | 5.50 | 5.50 | 5.50 | 5.50 | 5.50 |
| Silicone surfactant[2] | 1.20 | 1.20 | 1.20 | 1.20 | 1.20 |
| Amine catalyst[3] | 0.47 | 0.47 | 0.47 | 0.47 | 0.47 |
| Flame retardant[4] | 7.00 | 7.00 | 7.00 | 7.00 | 7.00 |
| Tin catalyst[5] | 0.25 | 0.25 | 0.25 | 0.25 | 0.25 |
| Toluene diisocyanate | 70.80 | 70.80 | 70.80 | 70.80 | 70.80 |
| 2-Component stabilizer | — | 0.5 | — | 0.495 | 0.49 |
| Phenothiazine | — | — | 0.5 | 0.005 | 0.01 |
| Scorch | Very Severe | Moderate | Severe | Very Light | Light |

[1] NIAX$^R$ 16-52 manufactured by Union Carbide Company
[2] NIAX L-5750 manufactured by Union Carbide Company
[3] NIAX A 127 manufactured by Union Carbide Company
[4] FYROL FR 2 manufactured by Akzo
[5] NIAX D 19 manufactured by Union Carbide Company

EXAMPLE 2

Scorch resistance of polyurethane foams was determined by the microwave scorch test described in Example 1.

The test specimens and the obtained results are given in Table II. Specimen 6 contained no stabilizer and was very severely discolored. Specimen 7 contained the stabilizer mixture consisting of 25.0 percent tetrakis[methylene(3,5-di-tert-butyl-4-hydroxyhydrocinnamate)]methane and 75 percent of a reaction product of diisobutylene and diphenylamine, described in Example 1, hereinafter 2-component stabilizer. Specimen 8 contained the same amount of phenothiazine. Specimen 7 showed moderate scorch protection, while specimen 8 was severely discolored. Specimens 9 and 10 contained the synergistic three component mixtures of the invention and showed light or very light discoloration as a result of improved scorch resistance.

The above embodiments and illustrations have shown various aspects of the present invention. Other variations will be evident to those skilled in the art and such modifications are intended to be within the scope of the invention as defined in the appended claims.

What is claimed is:

1. A liquid stabilizer composition for reduction of scorch in polyurethane foam comprising
   (a) tetrakis[methylene(3,5-di-tert-butyl-4-hydroxyhydrocinnamate)]methane and
   (b) a reaction product of diphenylamine and diisobutylene wherein the molar ratio of the amine to the diisobutylene is 1:1.1 to 1:2.5 and wherein the ratio of the hydrocinnamate compound to the reaction product is about 1:5 to 5:1.

2. The stabilizer composition according to claim 1 which further contains about 0.5 to 10.0 percent by weight of trihydrocarbyl phosphite wherein the hydrocarbyl is independently selected from phenyl and alkyl groups.

3. A liquid stabilizer composition for reduction of scorch in polyurethane foam comprising
   (a) tetrakis[methylene(3,5-di-tert-butyl-4-hydroxyhydrocinnamate)]methane,
   (b) a reaction product of diphenylamine and diisobutylene wherein the molar ratio of the amine to the diisobutylene is 1:1.1 to 1:2.5, and
   (c) phenothiazine compound of the formula

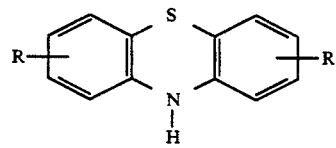

wherein each R is independently hydrogen or an alkyl group having 9 to 26 carbon atoms and wherein the ratio of the phenol compound to the reaction product is about 1:5 to 5:1 and the ratio of the mixture of components (a) and (b) to the phenothiazine compound is about 9.0:0.05 to 9.0:0.5.

4. The stabilizer composition according to claim 3 which further contains about 0.5 to 10.0 percent by weight of trihydrocarbyl phosphite wherein the hydrocarbyl is independently selected from phenyl and alkyl groups.

5. The stabilizer composition according to claim 1 which further contains about 0.5 to 10.0 percent by weight of tridecyl phosphite.

6. A polyether polyol composition stabilized against degradation comprises a major portion of a polyether polyol having 2 to 10 hydroxy groups and a minor stabilizing amount of a liquid stabilizer composition comprising
   (a) tetrakis[methylene(3,5-di-tert-butyl-4-hydroxyhydrocinnamate)]methane and
   (b) a reaction product of diphenylamine and diisobutylene wherein the molar ratio of the amine to the diisobutylene is 1:1.1 to 1:2.5
   and wherein the ratio of the hydrocinnamate compound to the reaction product is about 1:5 to 5:1.

7. The polyether polyol composition according to claim 6 wherein the stabilizer composition is present in the amount of 0.01 to 5.0 percent by weight.

8. The polyether polyol composition according to claim 6 wherein the stabilizer composition further contains about 0.5 to 10.0 percent by weight of trihydrocarbyl phosphite, wherein the hydrocarbyl is independently selected from phenyl and alkyl groups.

9. a polyether polyol composition stabilized against degradation comprises a major portion of a polyether polyol having 2 to 10 hydroxy groups and a minor stabilizing amount of a liquid stabilizer composition consisting of
   (a) tetrakis[methylene(3,5-di-tert-butyl-4-hydroxyhydrocinnamate)]methane,
   (b) a reaction product of diphenylamine and diisobutylene wherein the molar ratio of the amine to the diisobutylene is 1:1.1 to 1:2.5, and
   (c) phenothiazine compound of the formula

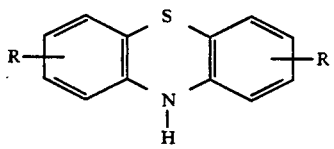

wherein each R is independently hydrogen or an alkyl group having 9 to 26 carbon atoms and wherein the ratio of the phenol compound to the reaction product is about 1:5 to 5:1 and the ratio of the mixture of components (a) and (b) to the phenothiazine compound is about 9.0:0.05 to 9.0:0.5.

10. The polyether polyol composition according to claim 9 wherein the stabilizer composition is present in the amount of 0.01 to 5.0 percent by weight.

11. The polyether polyol composition according to claim 9 wherein the stabilizer composition further contains about 0.5 to 10.0 percent by weight of trihydrocarbyl phosphite, wherein the hydrocarbyl is independently selected from phenyl and alkyl groups.

12. In the preparation of polyurethane foams by reacting a polyether polyol and polyisocyanate compound in the presence of water, a catalyst and a surfactant, the improved method of reducing discoloration due to scorch of polyurethane foam comprising the steps of
 (i) adding to the polyol about 0.01 to 5.0 percent by weight of a liquid stabilizer composition comprising
 (a) tetrakis[methylene(3,5-di-tert-butyl-4-hydroxyhydrocinnamate)]methane,
 (b) a reaction product of diphenylamine and diisobutylene wherein the molar ratio of the amine to the diisobutylene is 1:1.1 to 1:2.5, and wherein the ratio of the hydrocinnamate compound to the reaction product is about 1:5 to 5:1,
 (ii) stirring the polyol and stabilizer mixture at ambient temperature,
 (iii) foaming into foam at ambient temperature and
 (iv) curing at 120° to 205° C.

13. In the preparation of polyurethane foam by reacting a polyether polyol and polyisocyanate compound in the presence of water, a catalyst and a surfactant, the improved method of reducing discoloration due to scorch of polyurethane foam comprising the steps of
 (i) adding to the polyol about 0.01 to 5.0 percent by weight of a liquid stabilizer composition consisting of
 (a) tetrakis[methylene(3,5-di-tert-butyl-4-hydroxyhydrocinnamate)]methane,
 (b) a reaction product of diphenylamine and diisobutylene wherein the molar ratio of the amine to the diisobutylene is 1:1.1 to 1:2.5, and
 (c) phenothiazine compound of the formula

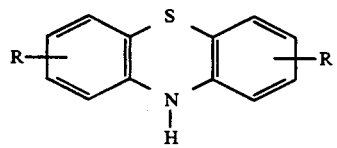

wherein each R is independently hydrogen or an alkyl group having 9 to 26 carbon atoms and wherein the ratio of the hydrocinnamate compound to the reaction product is about 1:5 to 5:1 and the ratio of the mixture of components (a) and (b) to the phenothiazine compound is about 9.0:0.05 to 9.0:0.5.
 (ii) stirring the polyol and stabilizer mixture at ambient temperature,
 (iii) foaming into foam at ambient temperature and
 (iv) curing at 120° to 205° C.

* * * * *

UNITED STATES PATENT AND TRADEMARK OFFICE
CERTIFICATE OF CORRECTION

PATENT NO. : 5,219,892
DATED : June 15, 1993
INVENTOR(S) : Richard A. Suhoza

It is certified that error appears in the above-identified patent and that said Letters Patent is hereby corrected as shown below:

Column 1, lines 49-51

"tetrakis[methylene(3,5-di-tert-butyl-4-hydroxyhydrocinnimate)] methane" should be -- tetrakis[methylene(3,5-di-tert-butyl-4-hydroxyhydrocinnamate)] methane -- ;

Column 1, line 53

"inhibiors" should be -- inhibitors -- ;

Column 2, lines 67-68

"tetrakis[methyllene(3,5-di-tert-butyl-4-hydroxyhydrocinnamate)] methane" should be -- tetrakis[methylene(3,5-di-tert-butyl-4-hydroxyhydrocinnamate)] methane --.

Signed and Sealed this

Seventh Day of February, 1995

*Attest:*

BRUCE LEHMAN

*Attesting Officer*     *Commissioner of Patents and Trademarks*